(No Model.)
J. T. STEWART.
VALVE DEVICE.
No. 499,896. Patented June 20, 1893.
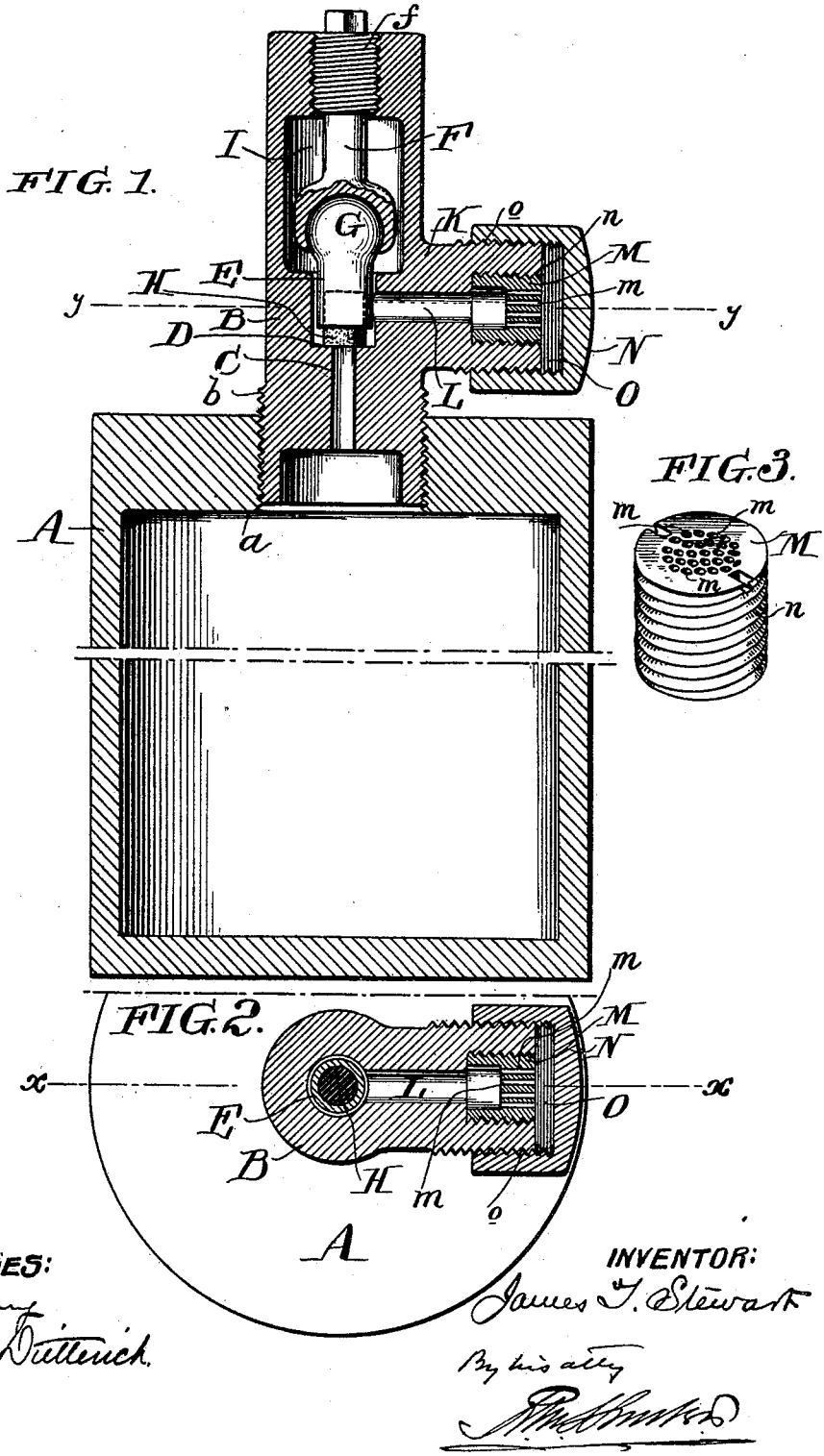
WITNESSES:
INVENTOR:
James T. Stewart

UNITED STATES PATENT OFFICE.

JAMES T. STEWART, OF PHILADELPHIA, PENNSYLVANIA.

VALVE DEVICE.

SPECIFICATION forming part of Letters Patent No. 499,896, dated June 20, 1893.

Application filed September 21, 1892. Serial No. 446,410. (No model.)

*To all whom it may concern:*

Be it known that I, JAMES T. STEWART, of the city and county of Philadelphia and State of Pennsylvania, have invented an Improvement in Valve Devices, of which the following is a specification.

My invention relates to valve devices, and consists of certain improvements which are fully set forth in the following specification and are shown in the accompanying drawings which form a part thereof.

It is the object of my invention to produce an improved valve device, particularly suited for vessels adapted to contain liquids or gases under high pressure.

My invention is designed to simplify the construction and extend the durability of the valve device, and to enable a vessel to be easily and quickly charged and discharged.

My invention is also designed to permit a quick charging of a vessel, and to permit a slow discharge when desired of gas or liquids under very high pressure in such a manner that the extent of discharge may be perfectly under the control of the user.

The invention is particularly suited for vessels which are to be filled for purposes of shipment and commercial use with a gas or liquid under high pressure, and from which the gas or liquid is to be drawn off by the consumer in such quantities as may be desired for immediate consumption or use. It is especially adapted for the commercial storing and shipment of carbonic acid gas, and permits the vessel to be quickly charged with the gas in a liquefied or crystallized state, and to be drawn off by the consumer in small quantities in a gaseous condition.

In the drawings Figure 1 is a vertical sectional view of my improved valve device applied to a vessel taken in the line $x—x$ of Fig. 2. Fig. 2 is a horizontal sectional view of the same on the line $y—y$ of Fig. 1; and Fig. 3 is a perspective view of the detached outlet.

A is the vessel, or chamber, to which the valve device is applied. This vessel, or chamber, may be provided with a suitable orifice $a$ to receive the valve device.

B is the stem of the device, suitably adapted for attachment to the orifice $a$ of the vessel or chamber A, as by the threaded nipple $b$.

C is a passage way in the stem B leading through the nipple $b$ to the interior of the vessel A.

D is a valve seat in the passage way C.

E is a valve carried by the valve stem F, to which it is connected by a loose joint G. The loose joint G is preferably a ball and socket joint as shown. The valve stem F passes up through the top of the stem B, and is provided with a screw threaded portion $f$, by which it may be adjusted in the stem F to move the valve to and from its seat D.

The base of the valve E is preferably recessed to receive a block H of rubber, or felt, which thus forms the face of the valve and rests upon the seat D. This feature is not, however, vital to my invention. The interior of the stem B. is preferably enlarged as at I, to afford play for the joint G between the valve and valve stem. The joint G produces a perfect centering of the valve E upon its seat, since the socket allows the valve E to move with reference to the stem F. The loose joint G also permits the stem F to be turned, in the adjustment of the valve, without turning the valve E upon its seat D, and the cutting, or abrasion of the packing H is avoided.

K is an arm of the stem B, having a passageway L opening to the passageway C above the seat D. The end of the passageway L is closed by a plug M, having a series of small perforations $m$. This perforated plug M may be provided with external screw threads $n$, which engage the internally screw threaded end of the passageway L.

O is a packing seated on the end of the branch piece K and closing the orifices $m$ on the plug M.

N is a detachable cap fitting over the end of the branch K to hold the packing O in place. The cap N may be detachably connected with the branch K by the screw threads $o$.

The passageways C and L constitute both inlet and outlet passageways for charging and discharging the vessel A.

The operation of the apparatus is as follows:—When the vessel A is to be charged, the cap N, packing O, and plug M are removed, the valve E is opened, and the carbonic acid, or other gas or liquid, is introduced into the vessel A, through the passageways C and L. Since the plug M has been removed the gas or liquid may pass freely into the passageway L, and the vessel may be quickly and easily charged. When the vessel A is filled with the desired quantity of gas or liquid, the valve E is closed, and the plug M, packing O and cap N are applied. The vessel may now be stored away, or shipped. If desired a packing and cap, similar to the packing O and cap N, may be applied on the end of the valve stem F, to effectively prevent the escape of any of the contents of the vessel. To discharge the vessel of a greater or less portion of its contents, the cap N and packing O are removed, leaving the perforated plug M in place, the valve E is opened, and the gas or liquid is allowed to escape by the passageways C and L, through the perforations $m$ of the plug M. The gas or liquid thus passing through the perforated cap, escapes slowly and is under more perfect control, so that as small a quantity of the gas as may be desired may be drawn off. Thus by means of a single valve device of very simple construction, a free and quick charging of the vessel, and a slow discharging under perfect control, may be accomplished. This is particularly desirable in the commercial hauling and use of carbonic acid gas. With the free inlet L, when the plug M is removed, the gas may be introduced easily and quickly in a liquefied or crystallized condition, and the vessel A may be filled with this liquefied or crystallized gas and shipped to the consumer. With this constricted outlet, due to the presence of the perforated plug M, the gas may be drawn off by the consumer in a gaseous state, and in such small volumes as may be required for immediate use.

While I prefer such minor details of construction as have been shown for the purpose of clearly illustrating my invention, I do not mean to limit myself to them, as it is apparent that they may be varied without departure from the invention.

What I claim as new, and desire to secure by Letters Patent, is as follows:

1. A valve device consisting of the body B having the passageways C and L, and the seat D in the passageway C, the valve stem consisting of the upper part F having a socket, and the lower portion E provided with a ball G fitting the socket of the part F and provided with a compressible block H on its lower end seating on the seat D.

2. A valve device consisting of the body B having the passageways C and L and the seat D in the passageway C, the valve stem consisting of the upper part F having a socket, the lower portion E provided with a ball G fitting the socket of the part F, and the removable plug M having contracted orifices and fitting within the passageway L.

3. A valve device consisting of the body B having the passageways C and L, and the seat D in the passageway C, the valve stem consisting of the upper part F having a socket, the lower portion E provided with a ball G fitting the socket of the part F, the removable plug M having contracted orifices and fitting within the passageway L, and the detachable cap N over the plug M.

4. A valve device consisting of the main stem provided with a passageway and a valve seat located therein, an adjustable valve stem, a valve swiveled to the valve stem, and a compressible block carried by the valve.

5. A valve device having a common charging and discharging passageway, a valve therein, and a detachable constricted orifice for said common charging and discharging passageway, consisting of a removable plug having a series of small perforations.

6. A valve device consisting of the stem B, having the passageway C, with the valve seat D therein, the branch K having the passageway L, opening to the passageway C beyond the seat D, a valve for seating in the seat D, and the detachable plug M having a constricted outlet carried by the branch at the passageway L.

7. A valve device provided with a common inlet and outlet passageway, a valve to open and close the passageway, and a removable plug M provided with constricted apertures $m$ located within the common inlet and outlet passageway.

8. A valve device provided with a common inlet and outlet passageway, a valve to open and close the passageway, a removable plug M provided with constricted apertures $m$ located within the common inlet and outlet passageway, and a removable cap N covering the removable plug M.

9. The valve device consisting of the body B provided with the passageway C and having the wing K provided with the passageway L and internally threaded at its extremity, a valve to control the passageway C, and the externally threaded removable plug M carried by the extremity of the wing K over the passageway L and having a series of contracted apertures $m$.

In testimony of which invention I have hereunto set my hand.

JAMES T. STEWART.

Witnesses:
ERNEST HOWARD HUNTER,
HELEN L. MOTHERWELL.